United States Patent Office 2,884,782
Patented May 5, 1959

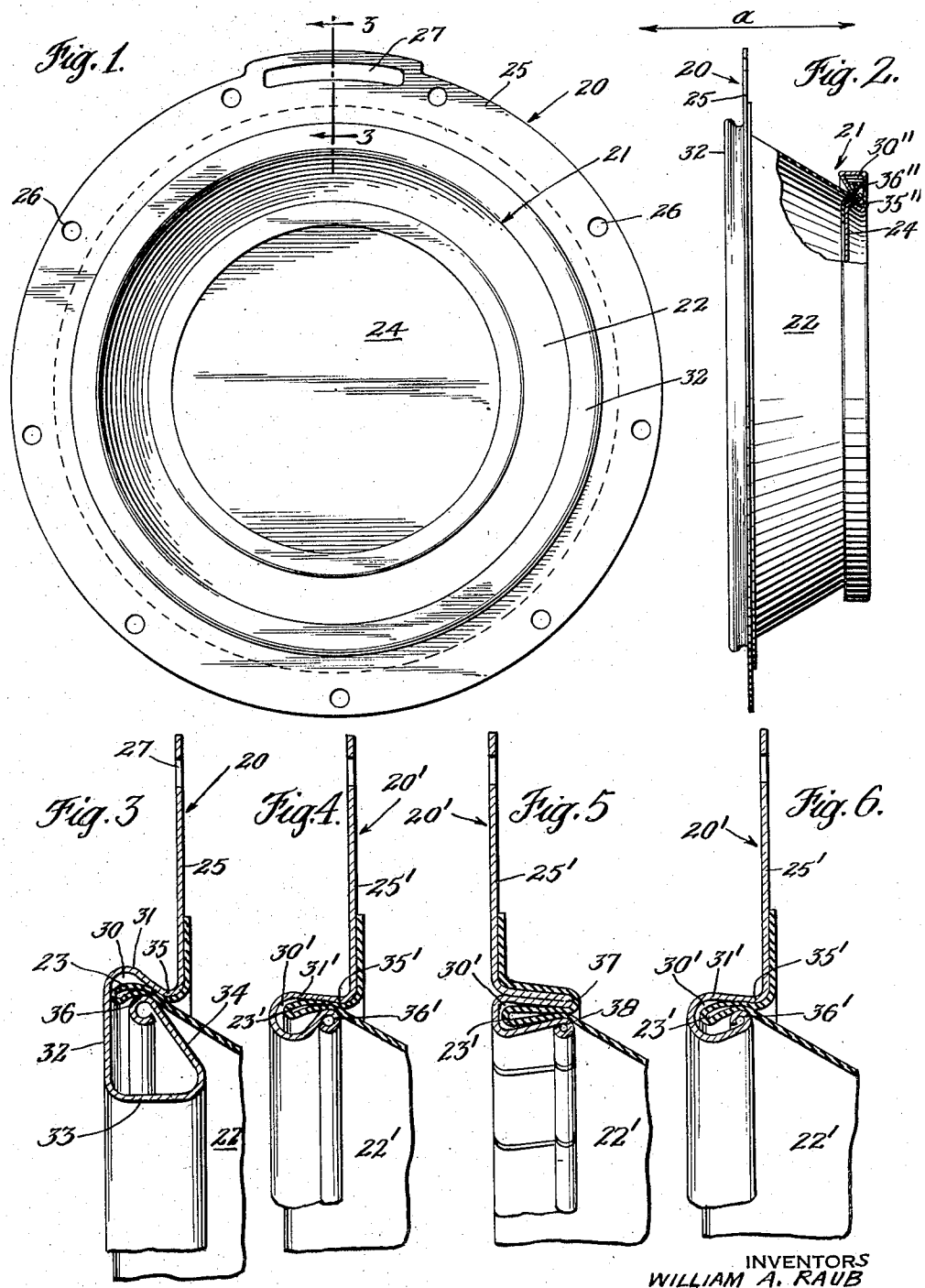

2,884,782

DIAPHRAGM STRUCTURE

William A. Raub, Haverford, and Roy Ullman, Willow Grove, Pa., assignors to The E. F. Griffiths Company, Philadelphia, Pa., a corporation of Pennsylvania Application January 17, 1956, Serial No. 559,633

5 Claims. (Cl. 73—278)

This invention relates to diaphragm structures for gas measuring or recording meters, and more particularly to improvements in means and manner of attaching the flexible diaphragm material to the annular mounting frame, or to the central diaphragm plate, or to both.

A principal object of this invention is to provide a simplified and improved means and manner of attaching a flexible member, such as a sheet of diaphragm material, to a frame, plate or other relatively rigid member for mounting or supporting the flexible member.

Another object of this invention is the provision of a diaphragm structure or the like, in which a flexible member is secured directly to an annular frame or other relatively rigid supporting member, but without utilizing any separate securing cord, wire or band.

A further object of this invention is the provision of an improved and simplified means and manner for hermetically securing a flexible member, such as a leather diaphragm, to an annular mounting frame, a supporting plate or the like.

While the several features and principles of this invention may be applied to various structures, including for example, the attachment of tubular casings or hoses to ferrules or coupling members, the invention will be described and illustrated herein as applied to a diaphragm structure for gas measuring or recording meters.

In many types of such meters, one or more diaphragm units are mounted within the meter casing, dividing it interiorly into a plurality of gas measuring chambers. By appropriately arranged valve mechanism, the gas is alternately admitted into and expelled from the measuring chambers on opposite sides of each diaphragm unit, thus causing the diaphragms to reciprocate back and forth within the meter casing. The diaphragm movements actuate volumetric recording dials through suitable connecting linkage. Apart from the diaphragm unit, the construction of the gas meter itself forms no part of this invention.

Prior to the present invention, in diaphragm structures for gas measuring meters the diaphragm material has been attached to the mounting frame by means of a cord, wire or band overlying the marginal edge of the material and wrapped around an annular flange on the mounting frame, or disposed within a groove in the mounting frame; the cord, wire or band binding the diaphragm material between it and the flange or within the groove. Likewise, the diaphragm plate or disc, usually mounted centrally on the diaphragm material, has been attached thereto by a similar cord, wire or band wrapped around an annular flange formed on the periphery of the disc, or by a pair of discs disposed one within the other and fastened together by rivets, bolts or spot welds, and with the diaphragm material secured between them.

Such means of securing the diaphragm material to the mounting ring or to the diaphragm plate have a number of disadvantages and drawbacks, including (1) the tendency of the binding cord or wire to slip out of place or to break under the continued reciprocation of the diaphragm, (2) the difficulty and attendant expense in properly positioning and tightening the cord, wire or band around the flange or within the groove to insure uniform attachment of the diaphragm material to the frame or plate, (3) the difficulty and attendant expense in arranging the diaphragm material uniformly on the flange or within the groove in order to minimize the creases and wrinkles which result from such means of attachment of the diaphragm material to the annular flange or groove, and so as to produce a satisfactory gas-tight joint between the diaphragm and the frame or plate, and (4) the additional cost in both material and labor resulting from the employment of the securing cord, wire or band, or the double diaphragm plates when used.

The present invention avoids the foregoing disadvantages and drawbacks, and provides a simpler and less expensive manner and means for securing the diaphragm material to the mounting frame or diaphragm plate, with attendant improvements in the attachment of the diaphragm material to the frame or plate, and in the hermetic attachment effected therebetween.

The foregoing and other features and advantages of this invention will become more apparent from the following description of the several embodiments of the invention illustrated in the accompanying drawings as applied to a diaphragm structure for gas measuring or recording meters, and in which:

Fig. 1 is a front elevation of a gas meter diaphragm structure in accordance with this invention;

Fig. 2 is a side elevation of the diaphragm structure of Fig. 1 and showing the diaphragm member in one of its fully extended positions, and with a portion being broken away and shown in section;

Fig. 3 is an enlarged sectional view of a portion of the mounting frame and attached diaphragm material, taken along the line 3—3 of Fig. 1;

Figs. 4, 5 and 6 are enlarged sectional views similar to Fig. 3, of modified diaphragm structures in accordance with this invention.

The diaphragm structure embodying the present invention, as illustrated in Figs. 1 and 2, consists of an annular frame or mounting ring 20 to which is secured a flexible diaphragm 21 including the diaphragm material 22 with a diaphragm disc or plate 24 centrally supported thereon. The flat web 25 of the frame has a series of holes 26 for accommodating bolts which join members of the meter casing (not illustrated), the diaphragm structure being interposed between the casing members and thus providing a measuring chamber on each side of the diaphragm. A slot 27 formed in the outer margin of the frame communicates with the exhaust or discharge passage in the meter casing.

The diaphragm plate 24 is usually formed of sheet metal, and with the attached diaphragm material 22, constitutes the flexible diaphragm 21. The latter is of sufficient diameter to extend over the opening of the mounting frame, to close such opening when the diaphragm material is secured to the frame, and to permit its reciprocation, for the desired stroke, through the mounting frame as indicated by the arrows (a) in Fig. 2.

The diaphragm material 22 is preferably a tough flexible material such as leather or leather-like fibrous or plastic materials which may be either inherently or suitably treated to be substantially impervious to the gas to be metered, or to render them more durable under prolonged contact with the gas passing through the meter and under the constant reciprocation action to which the diaphragm member 21 is subjected.

In accordance with this invention the diaphragm material 22 is secured to the relatively rigid mounting ring 20 by clamping it between opposed shoulders formed on the inner margin of the mounting frame. Frame 20 is initially formed as a substantially flat ring stamped or cut from thin sheet metal stock such as tin plate. Referring particularly to Fig. 3, a continuous annular channel 30 is formed in the inner margin of the frame with shaped frame elements 31—34 offset laterally from the plane of web 25. Element 31 is advantageously shaped so that the angle between it and the adjacent side of web 25 is somewhat less than 90°, thus forming a projecting shoulder 35 between web 25 and element 31. The innermost marginal edge of the frame is formed into a curved shoulder 36, and frame elements 32—34 are shaped and arranged so that shoulder 35 overlaps shoulder 36 and with shoulder 36 offset laterally from the plane of web 25 farther than shoulder 35 and biased or pre-tensioned toward shoulder 35 so as to grip the marginal portion of the diaphragm material therebetween when inserted into the channel.

The peripheral margin of the diaphragm material, which is folded as at 23, is inserted into channel 30 and clamped between opposed shoulders 35, 36. The diaphragm material is thus secured to the mounting frame by its compressive engagement between the opposed shoulders which are adjacent to and define the entrance of channel 30, and without any separate securing cord, wire or band as heretofore employed. By reason of the uniform clamping of the double layer of the diaphragm material between the opposed shoulders, a continuous hermetic attachment of the diaphragm to the mounting ring is effected.

The uncompressed fold or loop 23 within channel 30 provides additional resistance to movement of the diaphragm material out of the channel when tension is applied to diaphragm member 21. If desired, the margin of the diaphragm material may be coated with shellac or other adhesive prior to insertion into the channel, thus providing additional securance of the diaphragm material between the opposed shoulders.

Alternative forms of diaphragm structures embodying the principles of the invention are illustrated in Figs. 4, 5 and 6. In the frames 20' illustrated in Figs. 4 and 6, the elements forming channel 30' include a laterally extending element 31' having the less-than-90°-angle relation to the adjacent side of web 25' to provide the projecting shoulder 35'. The other channel-forming elements however, provide a smoothly curved channel frame, with the innermost shoulder 36' rolled outward from the channel in Fig. 4 but inward toward the channel in Fig. 6. In both of these modifications the shoulder 36' is offset laterally from web 25' farther than the shoulder 35' and is biased toward the latter so as to clamp the margin 23' of the diaphragm material therebetween when inserted into the channel.

In the frame illustrated in Fig. 5, the channel 30' is formed in the inner frame margin by deforming that part of the frame as shown. In this modification the opposed shoulders 37, 38 are not pre-biased toward one another, but instead are physically crimped or closed upon the folded diaphragm material after it has been inserted into the channel, and so as to compress or clamp the double layer of diaphragm material within the channel. Such an additional crimping operation may also be employed in the construction of the diaphragm units illustrated in Figs. 3, 4 and 6 if it is desired to increase the compressive or clamping force between the opposed shoulders. In all cases the double layer of diaphragm material within the channel is compressed to a thickness less than an uncompressed double layer of diaphragm material, as illustrated in Figures 3 through 6.

Apparatus for and the method of constructing diaphragm units in accordance with this invention are described and illustrated in applicants' copending application Serial Number 749,468, filed July 18, 1958.

One or more diaphragm plates may be attached to the diaphragm material in accordance with practices heretofore used. Alternatively, as shown in the sectional portion of Fig. 2, the diaphragm material 22, with the central portion thereof cut out to form a ring, may be secured to a single diaphragm plate 24 provided with a suitable channel 30" having opposed gripping shoulders 35", 36" in accordance with this invention.

Instead of the frame 20 or plate 24 being formed of sheet metal, they may be formed from suitable thermoplastic moulding compositions, in which event they are preferably pre-heated just before being inserted into the assembly block 40, and the assembly block, plunger and expander head are heated to provide for deforming the moulded plastic article and to crimp the opposed shoulders toward one another, incident to the attachment of the diaphragm material to the frame or plate.

These and other modifications of the invention and of its various applications within the scope of the following claims will occur to those skilled in the art.

We claim:

1. In a diaphragm structure for gas measuring meters, a flexible diaphragm, a relatively rigid annular frame adapted to mount the diaphragm between measuring chambers in the meter, a continuous annular channel in said frame adjacent the frame opening, opposed shoulders formed in said frame and defining the entrance of said channel, said diaphragm extending over and adapted to close the frame opening, the margin of said diaphragm being folded to form a double layer of diaphragm material, said double layer extending into said channel to a position beyond said shoulders, and said shoulders engaging said double layer of material between them and compressing said double layer to a thickness substantially less than the thickness of the uncompressed double layer of material within the channel, whereby said diaphragm is hermetically secured to said frame.

2. In a diaphragm structure for gas meters, a relatively rigid frame member adapted to be disposed between measuring chambers in the meter and having a central circular aperture, said member comprising a plane portion and a generally cylindrical portion joined to the plane portion by a first shoulder, said cylindrical portion having an annular channel-defining portion terminating in a second shoulder positioned opposite said first shoulder and defining therewith the entrance to the channel, and a flexible diaphragm extending across said central aperture, the marginal portion of the material of said diaphragm being folded to provide a double layer thereof, and said double layer extending into said channel with the fold toward the bottom of the channel and disposed beyond said entrance and said second shoulder being urged toward said first shoulder to compress said double layer of material within the channel to a thickness less than the thickness of the uncompressed double layer adjacent the fold, whereby said diaphragm is hermetically secured to said frame.

3. A construction according to claim 2 in which said second shoulder is returned to a position lying between the plane of said member and the parallel plane containing the bottom of the channel, and is separated from said first shoulder by a distance, measured in the plane of the member, less than the compressed thickness of the double layer of diaphragm material.

4. In a diaphragm structure for gas meters, an annular flexible diaphragm, a relatively rigid frame member adapted for mounting between measuring chambers in the meter, means securing the outer marginal portion of said annular diaphragm to said frame, a relatively rigid diaphragm plate, said plate having a generally cylindrical peripheral portion joined thereto by a first shoulder, said cylindrical portion having an annular channel-defining portion terminating in a second shoulder positioned opposite said first shoulder and defining therewith the entrance to the channel, the inner marginal portion of said annular diaphragm being folded to provide a double layer thereof, and said double layer extending into said channel with the fold toward the bottom of the channel and disposed beyond said entrance, and said second shoulder being urged toward said first shoulder to compress said double layer of diaphragm material within the channel to a thickness less than the thickness of the uncompressed double layer adjacent the fold, whereby said diaphragm is hermetically secured to said plate.

5. A construction according to claim 4 in which said second shoulder is returned to a position lying between the plane of said plate and the parallel plane containing the bottom of the channel, and is separated from said first shoulder by a distance, measured in the plane of the plate, less than the compressed thickness of the double layer of diaphragm material.

References Cited in the file of this patent

UNITED STATES PATENTS

| | | |
|---|---|---|
| 2,170,436 | Vogel | Aug. 22, 1939 |
| 2,200,295 | Peters | May 14, 1940 |
| 2,693,701 | Whitworth et al. | Nov. 9, 1954 |
| 2,715,336 | Schaus | Aug. 16, 1955 |